May 21, 1968 F. B. MERCER ET AL 3,384,530
EXTRUDED PLASTIC NET, METHOD OF MAKING THE
SAME AND SACK MADE OF SAID NET
Filed July 23, 1965 5 Sheets-Sheet 2
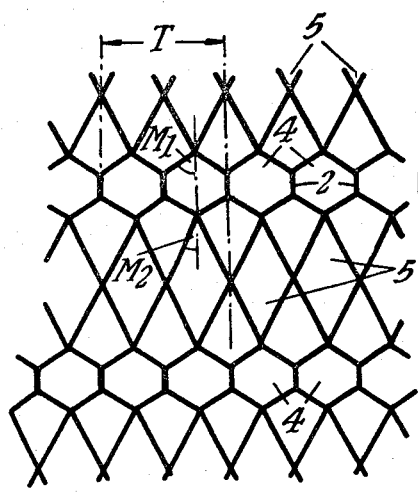
Fig.4.
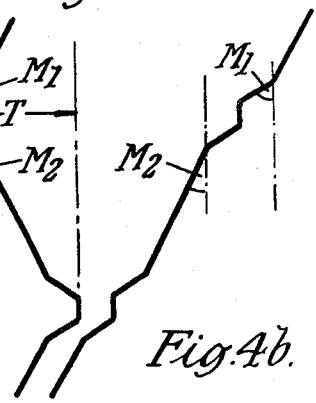
Fig.4a.
Fig.4b.
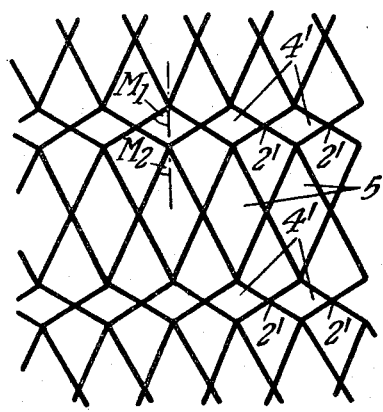
Fig.5. Fig.5a.
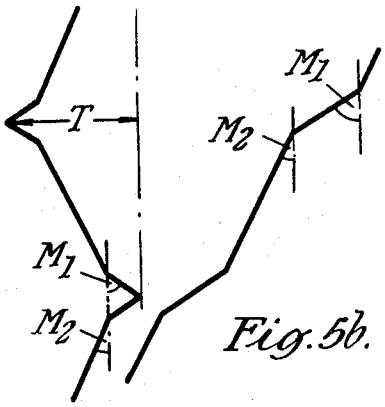
Fig.5b.
INVENTORS
KEITH FRASER MARTIN
FRANK BRIAN MERCER
ATTORNEY

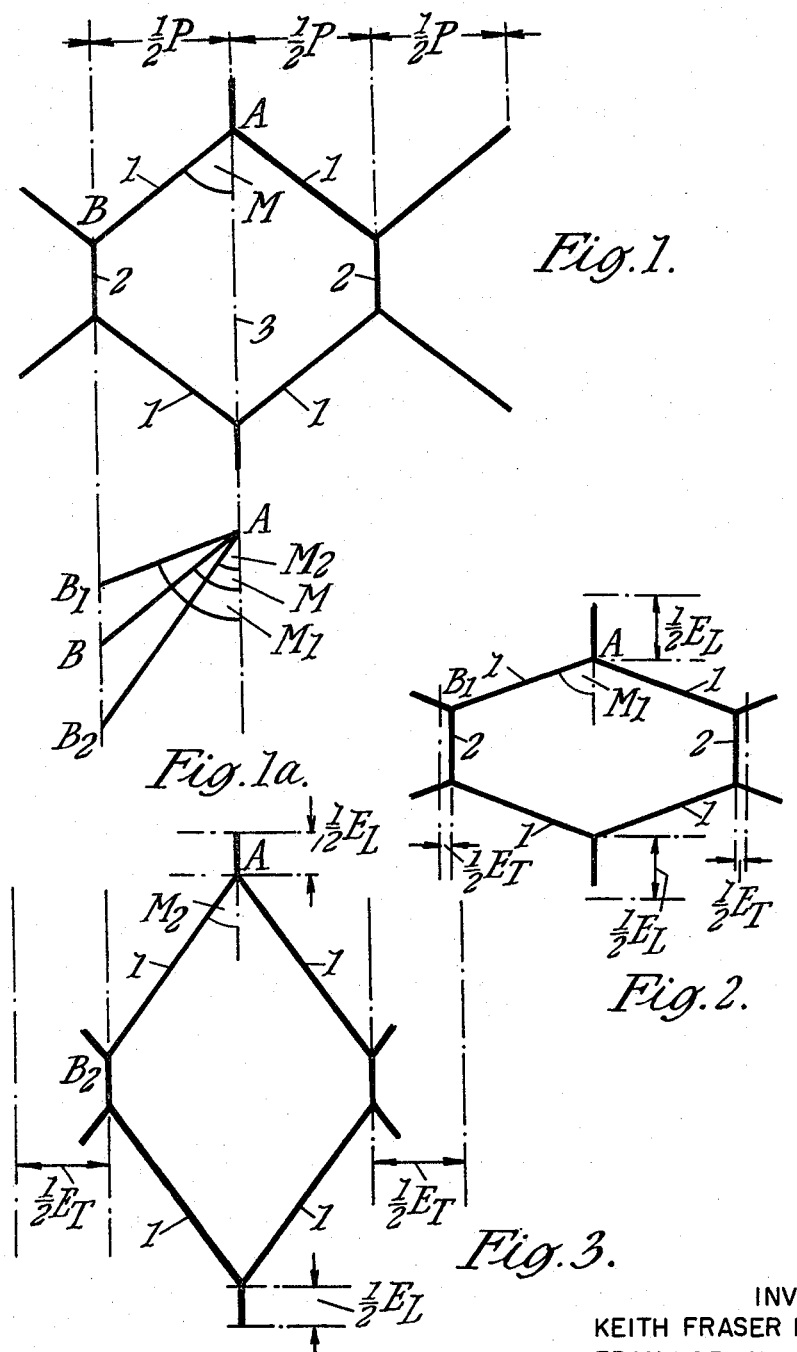

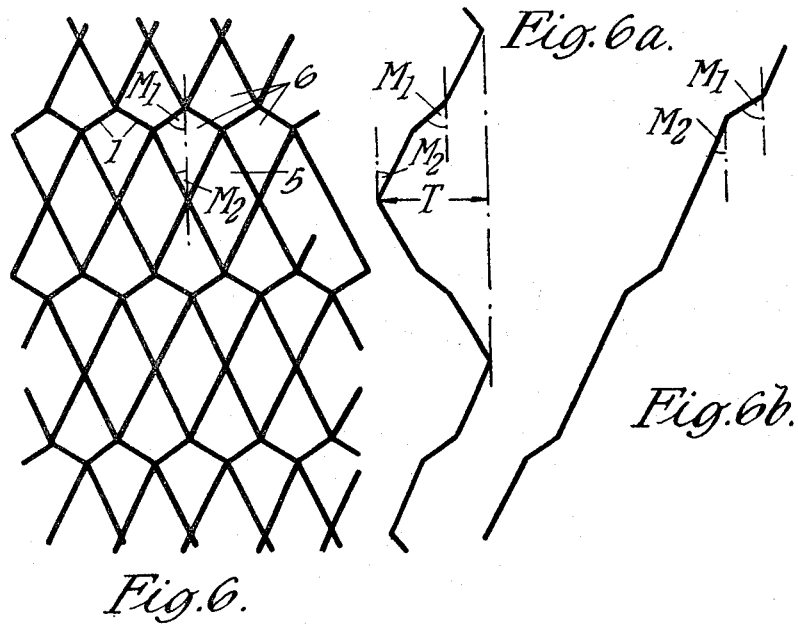
Fig. 6a. Fig. 6b.
Fig. 6.
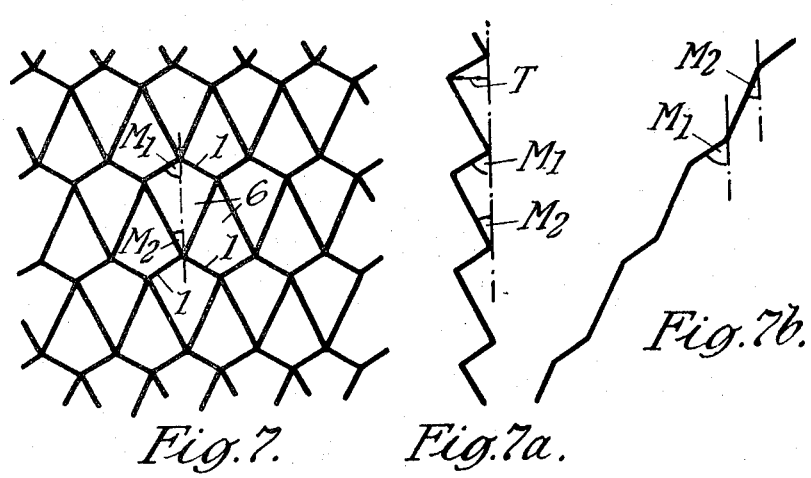
Fig. 7. Fig. 7a. Fig. 7b.
INVENTORS
KEITH FRASER MARTIN
FRANK BRIAN MERCER
ATTORNEY

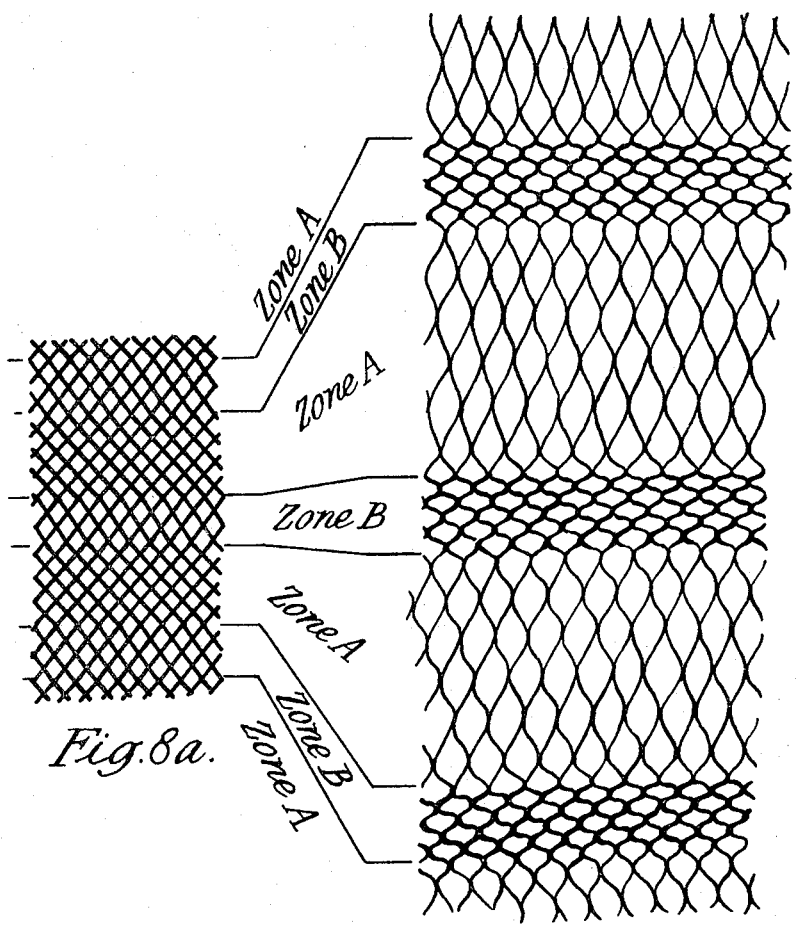

United States Patent Office 3,384,530
Patented May 21, 1968

3,384,530
EXTRUDED PLASTIC NET, METHOD OF MAKING THE SAME AND SACK MADE OF SAID NET
Frank Brian Mercer, Blackburn, and Keith Fraser Martin, Darwen, England, assignors to Plastic Textile Accessories Limited, Blackburn, England, a British company
Filed July 23, 1965, Ser. No. 474,431
Claims priority, application Great Britain, July 31, 1964, 30,382/64; Feb. 9, 1965, 5,656/65
11 Claims. (Cl. 161—109)

This invention relates to extruded integral (i.e. knotless) plastic netting of the type, for example, described in, and produced by the apparatus disclosed in, British Patent No. 836,555 or by similar equipment in which extrusion is effected through closely spaced sets of discrete die orifices, the extruded strands forming net intersections by contact and adhesion at or closely adjacent the die face.

An object of the present invention is to provide a net structure the dimensional stability of which can be controlled, particularly for packaging net which is of tubular form.

Tubular plastic packaging net should preferably have little or no longitudinal extensibility, i.e. is dimensionally stable in the longitudinal (or machine) direction; this is partly because the load of the packed commodity has to be supported when the bag is suspended vertically and partly because uncontrolled longitudinal extensibility is naturally accompanied by a reduction of the diameter of the tube, i.e. a diminution of the transverse dimension, which causes the sacks or bags to reduce in diameter making filling more difficult. As regards transverse dimensional stability, however, while tubular packaging net requires some "give" to enable and facilitate the packing of the commodity into the net bag tube, the "give" or transverse extensibility of the net must not be excessive or the final package loses shape and becomes "dumpy" and this results in an unattractive appearance, makes stacking more difficult and causes excessive use of floor space.

In a mesh, i.e. network, structure the degrees of longitudinal and transverse dimensional stability are controlled by the angle which the connecting strands of each mesh opening make with the line of the direction of extrusion, i.e. the longitudinal axis, the smaller the angle the greater the longitudinal dimensional stability and the less the transverse stability and the larger the angle (up to 90°) the less the longitudinal dimensional stability and the greater the transverse stability. Thus, a net having a mesh angle of 45° and having symmetrical meshes would have equal longitudinal and transverse extensibility.

It will be seen therefore that net meshes affording low transverse extensibility (which is required) have high longitudinal extensibility (which is undesirable) and net meshes affording high transverse extensibility (which is undesirable) have low longitudinal extensibility (which is required), the two mesh forms are therefore antagonistic.

Further it is emphasised that it is not the complete form of each mesh opening which is critical but the mesh angle of the connecting strands thereof; therefore, a kite shaped mesh, the two leading connecting strands of which (considered in the direction of extrusion) have a small mesh angle e.g. substantially less than 45° but which has the two trailing connecting strands at a mesh angle correspondingly greater than 45°, would have less transverse extensibility than a mesh having equal angles (i.e. a regular diamond shaped mesh). It is therefore the mesh angle of the connecting strands which is critical and which may be chosen, as described hereinafter, to afford zones of low transverse extensibility as required.

Put another way, for nets of constant mesh pitch, i.e. where the widths of each mesh opening, measured circumferentially of the net tube, are equal, the shorter each connecting strand of each mesh the less is the transverse extensibility.

The invention consists in an extruded integral (i.e. knotless) plastic net having successive rows of meshes wherein rows of mesh connecting strands provided at longitudinally spaced intervals of the net are disposed at a mesh angle of substantially more than 35° whereby said rows of connecting strands afford spaced parallel zones of reduced transverse extensibility, the number of such zones being selected having regard to the length of the net (at right angles to said zones) to restrict the longitudinal extensibility of the net to a desired percentage, and the intervening rows of mesh connecting strands having mesh angles substantially less than those of connecting strands in said zones and never more than 45°.

The terms "connecting strands," and "mesh angle" are defined hereinafter.

The invention further consists in an extruded integral (i.e. knotless) plastic net as set out above wherein each extruded strand follows an oscillatory path longitudinally of the net, the path between each crest altering in direction along its length to provide differing mesh angles.

In the accompanying drawings:

FIGURE 1 is a diagram of a mesh of a net of equal transverse mesh pitch and shows the mesh angle and the connecting strands.

FIGURE 1a is a diagram showing the relationship between mesh angle and connecting strand length.

FIGURE 2 is a diagram of a net mesh having high longitudinal extensibility and low transverse extensibility.

FIGURE 3 is a diagram of a net mesh having low longitudinal extensibility and high transverse extensibility.

FIGURE 4 shows a net mesh structure according to the present invention, having spaced transverse zones of meshes of low transverse extensibility.

FIGURES 4a and 4b show examples of the path of a single strand extruded respectively through an oscillatory die and through a rotating die.

FIGURES 5, 5a and 5b are similar to FIGURES 4, 4a and 4b but show spaced transverse zones of meshes having low transverse extensibility but without elongated mesh intersections.

FIGURE 6 shows an alternative form of mesh constrction, according to the present invention, in which there are provided spaced transverse bands of connecting strands affording zones of low transverse extensibility.

FIGURES 6a and 6b show examples of the path of a single strand extruded respectively through an oscillatory die and through a rotating die.

FIGURE 7 shows a modified form of mesh construction to that of FIGURE 6.

FIGURES 7a and 7b show examples of the path of a single strand extruded respectively through an oscillatory and through a rotating die.

FIGURE 8a shows a net as extruded having a mesh construction according to the present invention by variable speed counter-rotating dies.

FIGURE 8b shows the net of FIGURE 8a after stretching to effect molecular orientation of the plastic in the net strands.

Figure 9:
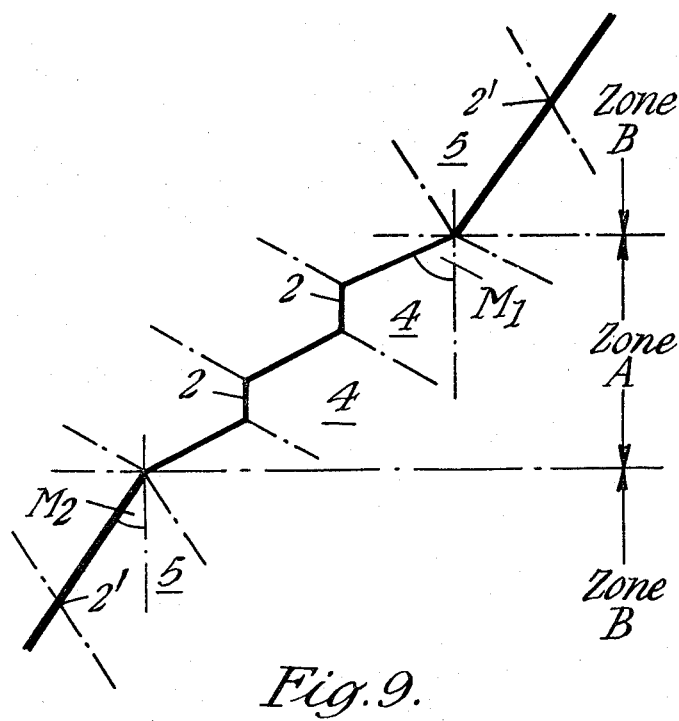
FIGURE 9 is a diagram, on an enlarged scale, of a single strand extruded from a variable speed rotating die, showing the relative gauge of the different strand portions.

The net mesh shown in FIGURE 1 of the drawings is made up of connecting strands 1 and intersections 2. The connecting strands 1 are at a mesh angle M to the longitudinal axis 3 of the net; the longitudinal axis of the net is also the direction of extrusion of the net.

The mesh shown in FIGURE 1 is part of a net of constant transverse pitch P so that the transverse distances between the intersections 2 are equal round the circumference of a tubular net or across the width of a flat net.

Considering the connecting strand AB, the greater the mesh angle M (up to 90°) the shorter becomes the connecting strand AB. Thus, for a connecting strand $AB_1$, see FIGURE 1a, which is shorter than the connecting strand AB, the mesh angle $M_1$ is greater than the mesh angle M and for a connecting strand $AB_2$, which is longer than the connecting strand AB, the mesh angle $M_2$ will be smaller than the mesh angle M.

Considering that the mesh angle M in FIGURE 1a is 45° then, as will be seen hereafter with reference to FIGURES 2 and 3, where $AB_1$ is shorter than AB (and consequently the angle $M_1$ is greater than the angle M) the net mesh having connecting strands as $AB_1$ will have increased transverse dimensional stability and decreased longitudinal dimensional stability; that is to say it will have decreased transverse extensibility and an increased longitudinal extensibility. Conversely, where the mesh has connecting strands as $AB_2$ which are longer than AB (and consequently the angle $M_2$ is less than the angle M) the net mesh will have decreased transverse dimensional stability, that is to say the mesh will have increased transverse extensibility and decreased longitudinal extensibility.

The above is shown separately in FIGURES 2 and 3. In FIGURE 2 the connecting strand $AB_1$ is shorter than AB and the mesh angle $M_1$ is greater than the mesh angle M; as a result the transverse extensibility ET is small whereas the longitudinal extensibility EL is large; in the mesh shown in FIGURE 3 the connecting strand $AB_2$ is longer than AB and the mesh angle $M_2$ is less than the angle M and as a result the transverse extensibility ET is large whereas the longitudinal extensibility EL is small.

It will be appreciated, therefore, that a net made up solely of meshes in the form shown in FIGURE 2 would have high longitudinal extensibility (i.e. poor longitudinal dimensional stability) and would have low transverse extensibility (i.e. good transverse dimensional stability). In the same way a net composed solely of meshes in the form shown in FIGURE 3 would have low longitudinal extensibility (i.e. good longitudinal dimensional stability) and high transverse extensibility (i.e. poor transverse dimensional stability).

Since, as explained above, it is desirable for tubular packaging not to have little or no longitudinal extensibility and at the same time reduced transverse extensibility, there is provided, according to the present invention, net structures in which spaced rows of mesh connecting strands or meshes having low transverse extensiiblity are alternated or interspersed with rows of mesh connecting strands or meshes having low longitudinal extensibility.

In FIGURE 4 of the drawings there is shown diagrammatically a net construction in which rows of meshes 4, of the type shown in FIGURE 2 of the drawings with a mesh angle $M_1$ and having low transverse extensibility are alternated with rows of meshes 5, as shown in FIGURE 3 of the drawings with a mesh angle $M_2$ and having low longitudinal extensibility.

It will be understood with reference to FIGURE 4 (and also to FIGURE 5) that the alternating bands of meshes may comprise each a plurality of rows of meshes, e.g. in FIGURE 4 more than one row of meshes 4 may comprise each band of FIGURE 2 type meshes and more than one row of meshes 5 may comprise each band of FIGURE 3 type meshes—see for example FIGURE 8b described hereinafter.

The net shown in FIGURE 4 of the drawings may be extruded, for example, on circular, concentric sets of dies as disclosed in British Patent No. 836,555 in which one or both of the dies are oscillated over a throw T, the path of a single strand being shown in FIGURE 4a. It has been found, however, that it is not always necessary to oscillate both dies and that if one die only is oscillated over the throw T, the other die being stationary, the strands extruded from the die orifices of the stationary die do not remain straight and parallel with the longitudinal axis but are pulled by the strands extruded from the oscillatory die into a configuration almost the same as that of the oscillatory die strands, so that for practical purposes it may only be necessary to oscillate one die.

In the preferred form of carrying out the invention, however, both dies are counter-rotated at varying speeds so that each die extrudes a strand in the form shown, for example, in FIGURE 4b, which strands extend helically round the extruded net tube (it will be appreciated that one die will extrude strands as shown in FIGURE 4b and the other die will extrude strands which are the mirror image of the strands shown in FIGURE 4b).

In both forms of strand extrusion, i.e. oscillatory or rotary, the speed of the die or dies is varied cyclically to provide the differential mesh angles $M_1$ and $M_2$. According to alternative method of producing net construction, according to the present invention, the two dies may be counter-rotated at constant speed and the variation in mesh angle, $M_1$ and $M_2$, achieved by varying the rate of haul-off of the net from the dies, or even by cyclic reciprocation of the mandrel on which the net tube is received after extrusion, although this is not a particularly satisfactory method.

It will be seen from FIGURE 4 of the drawings that there is provided, in the manner described above, spaced transverse bands or zones of meshes 4 which provide limited transverse extensibility of the net, interspersed with bands or zones of meshes 5 which provide limited longitudinal extension of the net. Thus, for a produce bag of tubular form closed at one end, the result is that the net during production, filling and when filled and in use, has limited longitudinal extensibility and at the same time limited transverse extensibility by virtue of the spaced bands or zones of meshes 4, which prevent the produce bag from spreading and becoming "dumpy," the spaced bands or zones of meshes 4 behaving in a manner analogous to the coopering bands of a barrel.

FIGURE 5 shows a net structure very similar to that of FIGURE 4 except that the next intersections 2′ are "point" intersections as compared with the intersections 2 of FIGURE 4 which are elongated. The effect of the net construction shown in FIGURE 5 is the same as that of FIGURE 4 and similarly this net may be produced either by oscillating one or both of the dies to give a strand formation as shown in FIGURE 5a, or, preferably, by counter-rotating the dies to give a strand form as shown in FIGURE 5b.

In FIGURE 6 there is shown a further modified form of net structure according to the present invention where instead of transverse rows of meshes 4 and 4′ as shown in FIGURES 4 and 5 respectively, in which such meshes are symmetrical about their transverse axis and have all four of their connecting strands equal, rows of meshes 6 are provided having a large mesh angle $M_1$ and a small mesh angle $M_2$, interspersed with rows of meshes 5 similar to the meshes 5 shown in FIGURES 4 and 5. In this form the connecting strands 1 of the rows of meshes 6 afford spaced transverse lines of reduced transverse extensibility.

Similarly as described with reference to FIGURES 4 and 5 the net may be extruded through oscillatory dies to give a strand path as shown in FIGURE 6a, or, preferably, by counter-rotation of the dies to give a strand path as shown in 6b.

FIGURE 7 shows a net structure which is a modification of that of FIGURE 6 in that meshes 6, having connecting strands 1 at a mesh angle of $M_1$, are arranged in successive rows without the intervention of the rows of diamond meshes 5 shown in FIGURE 6, the connecting strands 1 affording the spaced transverse lines of reduced transverse extensibility.

The mesh angle for meshes having low transverse extensibility (i.e. good transverse dimensional stability) is preferably above 45°, e.g. about 60°, but in some instances a mesh angle of as little as 35° may give adequate control of the transverse extensibility of the net, but in all cases the mesh angle for meshes having low longitudinal extensibility (i.e. good longitudinal dimensional stability) is always less than the mesh angle of the meshes having low transverse extensibility and always less than 45°.

The above described configurations of net are as extruded, but it will be appreciated that the plastic in the net strands can, and usually will, be subjected to molecular orientation by stretching, in known manner, to give an orientated net having the same general configuration or characteristic as the nets described above but with correspondingly increased dimensions of the net strands. Thus, FIGURES 4 to 7 may be taken to represent diagrammatically either (a) net as extruded (i.e. before stretching) on an enlarged scale, or (b) net after stretching and having the increased dimensions referred to above. In the orientated net, the net strands (i.e. the mesh connecting strands) are stretched and the plastic therein fully or partly molecularly orientated while the net intersections may or may not be stretched and the plastic therein orientated.

It will be appreciated that since the strands in the two types of mesh bands or zones lie at different mesh angles, the degree to which they will experience stretching will vary as will the degree of orientation. Further the degree of orientation will also be influenced in each type of mesh band or zone by the gauge of the mesh strands in each zone as described hereinafter with reference to FIGURES 8a, 8b and 9. The orientated net may be further treated by opening out the net transversely and heat setting the opened out net; by this treatment the differences between the mesh angles of the rows of meshes can be accentuated.

Due to the influence of mesh angle and strand gauge on stretching and orientation, the characteristics of the meshes in each band or zone of meshes may change or reverse as explained below.

In the case of nets made by cyclic oscillation of the dies or by varying the rate of haul-off, the original sets of bands or zones of meshes and the mesh angles therein, will in most cases maintain their mesh configurations and characteristics but with increased dimensions of the net strands (and hence larger meshes).

In other words in each band or zone having FIGURE 2 type meshes, as extruded, the same meshes will still be FIGURE 2 type meshes after stretching and molecular orientation and will retain their property of reduced transverse extensibility and, in each band or zone having FIGURE 3 type meshes, the same meshes will still be FIGURE 3 type meshes after stretching and molecular orientation and will retain their property of reduced longitudinal extensibility.

However, in the case of net structures according to the present invention produced by cyclically varying the rotational speed of continuously counter-rotating dies, the extensibility characteristics of the meshes in each set of zones will normally reverse relative to one another on stretching for molecular orientation. Thus, meshes in mesh zones having FIGURE 2 type meshes, as extruded, will become FIGURE 3 type meshes after stretching while meshes in mesh zones having FIGURE 3 type meshes, as extruded, will, after stretching, become relative to the other zone meshes, FIGURE 2 type meshes. As a result, meshes which, as extruded, would have low transverse extensibility (i.e. FIGURE 2 type) are converted to meshes having relatively high transverse extensibility (i.e. FIGURE 3 type) and low longitudinal extensibility and meshes which, as extruded, have low longitudinal extensibility with corresponding transverse extensibility (i.e. FIGURE 3 type) manifest, after stretching has taken place, a transverse extensibility which is low relative to the reconfigured meshes in the other set of zones (i.e. they become, in effect and relative to the other zone meshes, FIGURE 2 type meshes). Since there are still provided alternating sets of zones having substantially differing transverse extensibility, the net structure according to the present invention is maintained.

Thus consider a net, as extruded, as having one set of zones, Zone A, with mesh angles of 60° (i.e. FIGURE 2 type meshes) and the other set of zones, Zone B, with mesh angles of 45° (i.e. FIGURE 3 type meshes). In such a net, as shown in FIGURE 8A (although the exact values for the angles do not apply) before molecular orientation by stretching, the meshes in Zone A would have a transverse extensibility which is low compared with that of the meshes in Zone B, so that the meshes in Zone A contribute to the transverse dimensional stability of the net while the meshes in Zone B give a degree of longitudinal dimensional stability to the net. This is, of course, difficult to see in the as-extruded net.

After the net has been subjected to stretching to cause molecular orientation of the plastic in the mesh strands, see FIGURE 8B, the meshes in Zone A will have a mesh angle of say, 25° and have relatively high transverse extensibility, while the meshes in Zone B will retain a mesh angle of much the same order as originally, say 40° and have low transverse extensibility relative to the re-configured meshes in Zone A.

Thus:

| Relative transverse extensibility of mesh zones | Before Stretching | After Stretching |
| --- | --- | --- |
| Low | Zone A | Zone B |
| High | Zone B | Zone A |

The reason for this manifestation is that, in the case of the counter-rotating dies where the speed of rotation is cyclically varied, the plastic in the strands of the meshes having the higher mesh angle (Zone A or FIGURE 2 type) stretches first and more quickly than that in the strands of the other zone meshes (Zone B or FIGURE 3 type), so that by the time stretching has been completed in the originally higher mesh angle strands (Zone A meshes) the stretching (and consequent mesh angle reconfiguration) of the meshes in the zones of the other set (Zone B meshes) is less advanced or is relatively incomplete.

This, in turn, is due to the fact that, for constant extrusion pressure, the gauge of the mesh strands in the higher mesh angle meshes (Zone A meshes) is, of necessity, finer (i.e. has less plastic) than the gauge of the mesh strands in the zones of the other set (Zone B meshes) and consequently gives way more easily under the stretching tension, as indicated diagrammatically in FIGURE 9 which shows a single strand varying in gauge from Zone A to Zone B.

The present invention also is concerned with knotless plastic net made by extrusion where the strand extrusion dies are in two concentric sets comprising, each, discrete orifices or holes (as opposed to open-sided slots opening onto a common contact or slideway surface), such that each set of dies extruded parallel streams of mesh strands and the strands of the two sets cross one another, touch and adhere to form the net intersections externally of the dies.

We claim:

1. An extruded integral knotless plastic net having successive rows of meshes wherein rows of mesh connecting strands provided at longitudinally spaced intervals of the net are disposed at a mesh angle of substantially more than 35° whereby said rows of connecting strands afford spaced parallel zones of reduced transverse extensibility, the number of such zones being selected having regard to the length of the net at right angles to said zones to restrict the longitudinal extensibility of the net to a desired percentage and the intervening rows of mesh connecting strands having mesh angles substantially less than those of connecting strands in said zone and never more than 45°, whereby said intervening rows of connecting strands afford spaced parallel zones of reduced longitudinal extensibility.

2. An extruded integral knotless plastic net as claimed in claim 1 wherein the plastic in the net strands has been stretched and molecularly oriented.

3. An extruded integral knotless plastic net as claimed in claim 1 wherein the net is tubular and the successive rows of meshes extend transversely round the net tube.

4. An extruded integral knotless plastic net as claimed in claim 3 wherein the net strands extend helically in opposite bands around the net tube.

5. An extruded integral knotless plastic net as claimed in claim 3 wherein the net strands extend along oscillatory paths extending generally axially of the net tube.

6. A method of extruding integral knotless plastic net as claimed in claim 1 wherein two sets of die-carrying members having spaced strand-extruding die orifices are moved relatively to one another to create, in the strands, net intersections characterised by moving the die-carrying members at cyclically varying speeds whereby the mesh angle of the net meshes is correspondingly cyclically altered to provide said zones of reduced transverse extensibility and said zones of reduced longitudinal extensibility, the connecting strands of which have differing mesh angles.

7. A method of extruding integral knotless plastic net as claimed in claim 6 whereby the die-carrying members are circular and the die orifices are arranged in circular series characterised that the die-carrying members are counter-rotated with a superimposed cyclic variation of the rate of rotation.

8. A method of extruding integral knotless plastic net as claimed in claim 6 wherein the die carrying members are oscillated with a superimposed cyclic variation of the rate of movement over each throw.

9. A method of extruding integral knotless plastic net as claimed in claim 1 wherein two sets of die-carrying members having spaced strand-extruding die orifices are moved relatively to one another to create, in the strands, net intersections and wherein the resultant net is hauled-off by a pair of co-operating driven rollers characterised in that the rollers are driven at cyclically varying speeds whereby the mesh angle of the net meshes is correspondingly cyclically altered to provide said zones of reduced transverse extensibility and said zones of reduced longitudinal extensibility, the connecting strands of which have differing mesh angles.

10. A method of extruding integral knotless plastic net as claimed in claim 1 wherein two sets of circular die-carrying members having strand-extruding die orifices spaced in a circular series are moved relatively to one another to create, in the strands, net intersections and wherein the resultant tubular net passes over an internal supporting mandrel, characterised in that the supporting mandrel is cyclically reciprocated axially of the direction of net extrusion whereby the mesh angle of the net meshes is correspondingly cyclically altered to provide said zones of reduced transverse extensibility and said zones of reduced longitudinal extensibility, the connecting strands of which have differing mesh angles.

11. A sack made of a tubular plastic net as claimed in claim 3 closed at one end.

References Cited
UNITED STATES PATENTS

| | | | |
|---|---|---|---|
| 2,919,467 | 1/1960 | Mercer | 156—167 XR |
| 3,017,314 | 1/1962 | Kebekus et al. | |
| 3,222,440 | 12/1965 | Murphy | 18—12 |
| 3,234,071 | 2/1966 | Ward et al. | 156—441 |
| 3,242,023 | 3/1966 | Schultheiss | 156—167 |
| 3,272,679 | 7/1966 | Hebberling | 156—440 |
| 3,331,725 | 7/1967 | Mercer | 264—167 XR |

ROBERT F. BURNETT, *Primary Examiner.*

R. H. CRISS, *Assistant Examiner.*